US012601382B2

(12) United States Patent
Harke et al.

(10) Patent No.: US 12,601,382 B2
(45) Date of Patent: Apr. 14, 2026

(54) BRAKE BODY FOR A TRANSPORTATION VEHICLE AND METHOD FOR PRODUCING A BRAKE BODY

(71) Applicant: VOLKSWAGEN AKTIENGESELLSCHAFT, Wolfsburg (DE)

(72) Inventors: Markus Harke, Braunschweig (DE); Daniel Mohwinkel, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 859 days.

(21) Appl. No.: 17/809,307

(22) Filed: Jun. 28, 2022

(65) Prior Publication Data

US 2023/0013186 A1 Jan. 19, 2023

(30) Foreign Application Priority Data

Jul. 7, 2021 (DE) ..................... 10 2021 207 133.3

(51) Int. Cl.
*F16D 65/12* (2006.01)
*F16D 69/02* (2006.01)
(Continued)

(52) U.S. Cl.
CPC ......... *F16D 65/127* (2013.01); *F16D 65/125* (2013.01); *F16D 69/027* (2013.01);
(Continued)

(58) Field of Classification Search
CPC ................................................ F16D 2065/132
See application file for complete search history.

(56) References Cited

U.S. PATENT DOCUMENTS 5,901,818 A * 5/1999 Martino .................. F16D 69/02
188/218 XL
11,011,448 B2 * 5/2021 Mallik .................. H01L 21/561
(Continued)

FOREIGN PATENT DOCUMENTS

CN 101448601 A 6/2009
CN 102803749 A 11/2012
(Continued)

OTHER PUBLICATIONS

DIN EN 10027-2; Designation systems for steels—Part 2: Numerical system; German version EN 10027-2:2015; Jul. 2015; CEN; Brussels.

(Continued)

*Primary Examiner* — Melody M Burch
(74) *Attorney, Agent, or Firm* — BARNES & THORNBURG LLP

(57) ABSTRACT

A brake element for a transportation vehicle, having a base body that is planar at least in some regions, to the planar sides of which at least two build-up layers are applied in each case at least in some regions. The build-up layers form a surface which, in the mounted state of the brake element on the transportation vehicle, serves as a friction surface for a brake pad. There is a bonding zone in which both a material of the base body and a material of a build-up layer adjacent to the base body are present, wherein the bonding zone has a thickness perpendicular to an areal extent of a planar side that is less than 10 μm.

4 Claims, 5 Drawing Sheets

(51) Int. Cl.

| | |
|---|---|
| *F16D 65/02* | (2006.01) |
| *F16D 69/00* | (2006.01) |
| *F16D 69/04* | (2006.01) |

(52) U.S. Cl.
CPC .. *F16D 2065/132* (2013.01); *F16D 2069/005* (2013.01); *F16D 69/0408* (2013.01); *F16D 2069/0458* (2013.01); *F16D 2200/0021* (2013.01); *F16D 2200/006* (2013.01); *F16D 2250/0046* (2013.01); *F16D 2250/0076* (2013.01)

(56) References Cited

U.S. PATENT DOCUMENTS

| | | | | |
|---|---|---|---|---|
| 2008/0196986 | A1* | 8/2008 | Meckel | F16D 69/04 |
| | | | | 188/218 XL |
| 2009/0026025 | A1* | 1/2009 | Hampton | F16D 65/127 |
| | | | | 188/218 XL |
| 2013/0161136 | A1 | 6/2013 | Huschenhoefer et al. | |
| 2013/0333989 | A1 | 12/2013 | Oezer | |
| 2016/0273601 | A1 | 9/2016 | Broda et al. | |
| 2021/0035881 | A1 | 2/2021 | Mallik et al. | |

FOREIGN PATENT DOCUMENTS

| | | | | | |
|---|---|---|---|---|---|
| CN | 110925339 | A | | 3/2020 | |
| DE | 4413306 | C1 | | 10/1995 | |
| DE | 10345000 | B3 | | 1/2005 | |
| DE | 10342743 | A1 | * | 4/2005 | F16D 69/04 |
| DE | 102005008569 | A1 | | 10/2006 | |
| DE | 102006035948 | A1 | | 2/2008 | |
| DE | 102008035894 | A1 | | 3/2009 | |
| DE | 102008035849 | A1 | | 2/2010 | |
| DE | 102009003161 | A1 | | 11/2010 | |
| DE | 102011080332 | A1 | | 2/2012 | |
| DE | 102011012320 | A1 | | 8/2012 | |
| DE | 102011089152 | A1 | | 6/2013 | |
| DE | 102011089923 | A1 | | 6/2013 | |
| DE | 102013221737 | A1 | | 4/2015 | |
| DE | 102015204813 | A1 | | 10/2015 | |
| DE | 102014015474 | A1 | | 4/2016 | |
| DE | 102016200951 | A1 | | 7/2017 | |
| DE | 102018004270 | A1 | | 11/2019 | |
| DE | 102018221578 | A1 | | 6/2020 | |
| DE | 102019202492 | A1 | | 8/2020 | |
| DE | 102019208411 | A1 | | 12/2020 | |
| EP | 3034902 | A1 | | 6/2016 | |
| EP | 3787163 | A2 | * | 3/2021 | H02K 5/173 |
| WO | WO-9944773 | A1 | * | 9/1999 | B22D 19/14 |
| WO | 2020043712 | A1 | | 3/2020 | |

OTHER PUBLICATIONS

Office Action; Chinese Patent Application No. 202210794628.8; Aug. 9, 2025.

* cited by examiner

BRAKE BODY FOR A TRANSPORTATION VEHICLE AND METHOD FOR PRODUCING A BRAKE BODY

PRIORITY CLAIM

This patent application claims priority to German Patent Application No. 10 2021 207 133.3, filed 7 Jul. 2021, the disclosure of which is incorporated herein by reference in its entirety.

SUMMARY

Illustrative embodiments relate to a brake element for a transportation vehicle and to a method for producing such a brake element.

BRIEF DESCRIPTION OF THE DRAWINGS

Disclosed embodiments will be described in more detail with reference to the figures, in which.

DETAILED DESCRIPTION

Figure 1:
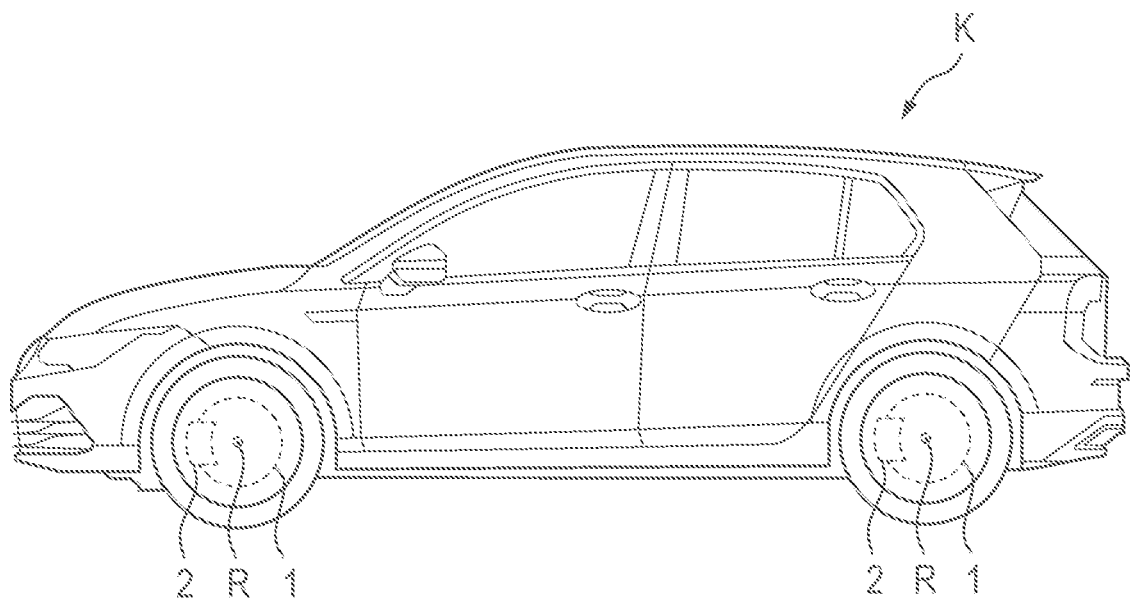
FIG. 1 shows a transportation vehicle with disclosed brake elements.

Brake elements, such as, for example, brake disks or brake disk friction rings, are conventionally produced from gray cast iron. The benefits of cast iron, in particular the high volumetric heat capacity and the relative resistance to thermal shock, are offset by various drawbacks. These include the high weight, the pronounced tendency to corrosion and the high wear of the material during operation of a transportation vehicle.

Corrosion results in visual defects, because the brake element is the only part of the transportation vehicle that develops red rust after only a very short time. In addition, brake discs are directly visible through the open aluminum rims that are frequently used.

Where a transportation vehicle is driven sparingly or in the case of large regeneration portions (if braking is carried out only rarely), the corrosion tendency of the material will in some circumstances lead to the brake element being damaged to such an extent that it has to be replaced prematurely.

Furthermore, the frictional wear of a brake element leads to the emission of particulates, the amount of which can significantly exceed the particulate emissions of a modern combustion engine.

To eliminate these drawbacks, it has hitherto been known, in addition to substituting all the material of the brake element with hard and corrosion-resistant materials (such as, for example, ceramics), also to protect the friction surfaces of the brake element with a suitable coating.

There are, accordingly, various approaches to finding a solution for coatings, in particular, for the friction surfaces of the brake element which are subjected to particular stresses, which are to serve the combined purpose of wear protection and corrosion protection. Coating takes place by thermal spraying methods for applying oxide-ceramic coatings or hard-material coatings. Various coating materials based on metallic alloys or composites of ceramic particles or hard-metal particles in a metallic matrix are thus used, which offer improved behavior in respect of corrosion and wear.

Examples of thermal spraying methods which may be mentioned include high-velocity slurry spraying, plasma spraying, cold gas spraying or wire arc spraying.

The adhesion of the layer to the substrate under the high thermomechanical stresses which act upon the brake element is often a problem with thermally sprayed coatings. In this respect, solutions are known in which the surface of the brake element is roughened prior to the thermal spraying by blasting with hard-material granules (DE 10 2008 035 894 A1), by ultrasonic/laser beam treatment (DE 10 2011 089 152 A1) or by electron beam treatment (DE 10 2011 012 320 A1).

To increase the adhesion of the thermally sprayed coating, it is further known to use an adhesion promoter layer as an intermediate layer. This is known, for example, from DE 10 2011 089 923 A1, in which an intermediate layer of nickel, copper and/or chromium which is deposited chemically or electrochemically in the cold state is described as the base for a thermally sprayed anti-wear layer.

Regardless of the roughening method or the use of an intermediate layer, the adhesion of a thermally sprayed layer is based almost exclusively on the principle of mechanical grouting of the incident spray particles onto the substrate.

Substantially stronger bonding is possible by using a metallurgical bond, for which the use of thermal energy is necessary to permit the atomic diffusion process at the boundary between the substrate and the coating. A choice can thereby be made between two alternatives:

On the one hand, the substrate can be heated prior to the spraying process, so that the diffusion process can take place as soon as the spray particles strike (see, for example, DE 10 2008 035 849 A1).

The second possibility is a melting process, in which heating takes place after the spraying operation, as is described in DE 10 2005 008 569 A1.

A drawback of the melting method is a very complex additional process operations because high temperatures are required and the process must in part be carried out in a vacuum furnace.

In addition to thermally sprayed coatings, DE 10 2006 035 948 A1 describes an electrolytically applied coating, in which hard materials are embedded in a ductile metallic matrix. Problems with this solution can be poor adhesion and very low ductility of the coating, which can result in the coating peeling off during operation. Furthermore, the process makes it difficult and expensive to achieve the required layer thicknesses.

As a further alternative, DE 10 345 000 A1 describes a build-up welding method by laser-beam, plasma or arc build-up welding for an anti-wear layer. The carrier material (substrate) is melted by an energy source and the coating material is supplied in the solid state to the molten pool. Alternatively, it is proposed to melt the carrier material after the coating material has been applied. The coating can consist of a metallic, ceramic or a composite material and can be applied over the entire surface or in strips. Owing to locally large temperature changes as a result of the process, pronounced cracks can occur in coatings with high hardness or high proportions of hard material, and such cracks allow the penetration of corrosive media to the base material and represent a considerable visual defect.

Finally, EP 3 034 902 B1, which contains the features of the preamble of the further independent claims, describes a multi-layer coating for brake disks by laser build-up welding. A base layer, which does not contain any high-melting particles, is thereby applied directly to the brake disk. A further layer which contains particles with a higher melting point than the disk main body of the brake disk is then applied to this base layer.

Disclosed embodiments provide a brake element for a transportation vehicle which has a coating with high wear resistance and high corrosion protection and which is inexpensive to produce. Disclosed embodiments also propose a method for producing such a brake element which is inexpensive to carry out.

With regard to the product claim, the disclosed embodiments proceed from a brake element for a transportation vehicle, having a base body that is planar at least in some regions, to the planar sides of which at least two build-up layers are applied in each case at least in some regions (that is to say at least in the region of the area that is covered by the brake pad). The build-up layers form a surface which, in the mounted state of the brake element on the transportation vehicle, serves as a friction surface for a brake pad.

The disclosed embodiments propose that there is a bonding zone in which both a material of the base body and a material of a build-up layer adjacent to the base body are present, wherein the bonding zone has a thickness perpendicular to an areal extent of a planar side that is less than 10 micrometers, optionally less than 5 micrometers.

In other words, the brake element according to the disclosed embodiments has in this region of the coating a degree of dilution (proportion of the material of the base body in the material of the adjacent build-up layer) which is significantly lower than in the conventional build-up welding processes.

The presence of such a bonding zone with the thickness makes it possible to prevent negative effects (granulation, increase in hardening) which can occur as a result of dilution of the substrate material. Nevertheless, good adhesion of the build-up layer to the base body can be achieved, wherein adhesive tensile strengths far exceeding 50 MPa can be achieved. This provides the basic requirement for high wear resistance and high corrosion protection.

A brake element within the meaning of the disclosed embodiments can be understood as being, for example, a brake disk or a brake disk friction ring.

According to a first disclosed embodiment, it is proposed that there is a first build-up layer, which is adjacent to the base body, and a second build-up layer, which is applied to the first build-up layer. When seen perpendicular to an areal extent of a planar side, the first build-up layer has a thickness in a range of from approximately 40 micrometers to approximately 120 micrometers, optionally a thickness in a range of from approximately 60 micrometers to approximately 100 micrometers. The second build-up layer, when seen perpendicular to an areal extent of a planar side, has a thickness in a range of from approximately 60 micrometers to approximately 420 micrometers, optionally a thickness in a range of from approximately 80 micrometers to approximately 400 micrometers.

It has been shown that, when such thicknesses of the build-up layers are produced, the first build-up layer can optimally fulfil the purpose of corrosion protection and inhibiting cracks from the second build-up layer.

By using the thickness range, high wear resistance can be achieved with the second build-up layer, which leads to a significant reduction in the particle emissions from the frictional wear of the brake element.

In an exemplary embodiment, the first build-up layer consists of an austenitic chromium-nickel-molybdenum steel. Such a steel has particularly ductile and viscous properties, by which the propagation of cracks can be stopped and the base body of the brake element can thus better be protected. This protection is essential to protect the substrate (the base body) from corrosive attack and to ensure the durability of the brake element as a whole.

It has been found to be particularly beneficial if the material of the first build-up layer has material properties which correspond to those of material 1.4404 according to standard EN10027-2 or material 316L according to the AISI standard.

In a further disclosed embodiment, the second build-up layer consists of a composite of an iron alloy matrix with intercalated tungsten carbide particles. The proportion of the volume of the intercalated tungsten carbide particles to the volume of the iron alloy matrix is thereby in a range of from approximately 20 percent to approximately 40 percent, optionally in a range of from approximately 25 percent to approximately 35 percent. Optionally, a range of from approximately 28 percent to approximately 33 percent is proposed.

By using such a volume distribution, a tendency of the second build-up layer to cracking owing to thermomechanical influences can noticeably be reduced. At the same time, optimal wear resistance and a good coefficient of friction during use of the brake element can thereby be achieved.

The volume distribution can easily be determined by a metallographic section through the second build-up layer.

As the material for the iron alloy matrix it has here likewise been found to be beneficial if it consists of a material which has material properties which correspond to those of material 1.4404 according to the standard EN10027-2 or material 316L according to the AISI standard.

As mentioned at the beginning, the disclosed embodiments also provide a method for producing a brake element. This method proceeds from a method for producing a brake element, wherein in a first method operation an energy beam is directed by at least one energy source onto a planar side of a planar base body of the brake element. The energy beam can be chosen as a light beam (e.g., laser beam) or also as an electron beam. In some circumstances a plasma beam is also conceivable, although such a beam is significantly more difficult to control or to dose. In any case, the beam may be a high-energy energy beam.

In the first method operation, a first powdered coating material is further supplied to a position that is acted upon by the energy beam to melt the first coating material and in this manner coat the planar side of the planar base body of the brake element with a first build-up layer.

After the first build-up layer has been applied, in a second method operation an energy beam (optionally likewise a high-energy energy beam) is directed by the at least one energy source onto a surface of the first build-up layer. A second powdered coating material is thereby supplied to a position that is acted upon by the energy beam to melt the second coating material and coat the first build-up layer with a second build-up layer.

According to the disclosed embodiments, it is proposed that a radiation intensity of the energy beam is maintained in a range of from approximately 500 W/mm2 to approximately 1500 W/mm2, optionally in a range of from approximately 600 W/mm2 to approximately 1400 W/mm2, at least in the second method operation during production of the second build-up layer.

It has been shown that, by maintaining such a range of the radiation intensity (i.e., radiated power based on the beam spot diameter on the substrate surface), it can be ensured that the second build-up layer does not overheat. Overheating leads to the tungsten carbide as a solid phase dissolving into a liquid phase and remaining dissolved in the iron alloy matrix of the second build-up layer. Owing to the dissolved material, the material of the iron alloy matrix becomes so brittle that cracks form.

Owing to the chosen radiation intensity, an optimal coating result with optimal quality and with optimal adhesion of the build-up layer can thus be achieved.

In a further development of the method, the energy beam is delivered to the respective substrate, at least in the second method operation, such that an intensity distribution of the energy beam with a top hat profile is obtained at the area of impact of the energy beam on the respective substrate.

A top hat profile is a profile in which the intensity distribution of the energy beam (beam spot) that strikes the substrate has an approximately constant height when seen over the diameter of the incident energy beam. The intensity distribution thus increases suddenly as a rectangular profile from the value of zero to a maximum value, remains approximately constant over the diameter of the laser beam and then suddenly falls to the value of zero again.

In this manner, the surface roughness of the build-up layer that is produced can be reduced significantly. This ultimately leads to a possible reduction in the amount removed in a subsequent grinding process of the surface and thus to a further reduction in costs.

To be able reliably achieve the preferred layer thicknesses of the brake element, it has been found to be expedient if each powdered coating material is supplied with a powder mass flow that is in a range of from approximately 15 g/min to approximately 220 g/min, optionally in a range of from approximately 20 g/min to approximately 200 g/min.

The powder grains of the coating material may be of spherical (ball-shaped) form and may be chosen in a size range of from approximately 10 μm to approximately 55 μm, optionally in a range of approximately from 15 μm to 50 μm.

In a further exemplary embodiment, it is proposed that, for applying the build-up layers, the brake element is oriented with its planar sides horizontal and is set in rotation. Both the energy beam and the respective coating material are thereby supplied from above to a planar side of the brake element. In other words, both the supply of the energy beam and the supply of the coating material are oriented at least substantially in the direction of the acting weight force.

This makes it possible for the coating material to be exposed to the energy beam for as long as possible and thus to interact therewith in the best possible manner.

For optimal heat development in the brake element during application of the build-up layers it has been found to be beneficial if the application of the build-up layers takes place by a feed movement, which runs radially from the inside to the outside, of a coating tool.

It has thereby been found to be beneficial, in respect of economical manufacture, if the radial feed movement of the coating tool takes place at a speed which is above approximately 90 m/min, optionally above approximately 100 m/min.

To ensure on the one hand that the method is carried out quickly and on the other hand that the base body is coated without gaps, it has been found to be beneficial if a radial feed movement of the coating tool and a speed of rotation of the brake element are matched to one another such that, during a complete rotation of the brake element, an overlap of a coating track applied during the rotation and a previously applied coating track (i.e., a coating track applied during a preceding complete rotation) in a range of from approximately 85 percent to approximately 95 percent, optionally of approximately 90 percent, is obtained.

A disclosed embodiment is shown in the figures and will be explained in greater detail in the following description with reference to the figures. Further features and benefits of the disclosed embodiments will thereby also become clear. Identical reference signs, also in different figures, refer to identical, comparable or functionally identical components. Corresponding or comparable properties and facets are thereby obtained, even if there is no repeat description thereof or reference thereto. The figures are not or at least not always true to scale. In some figures, proportions or distances may be shown in exaggerated form to be able to highlight features of an exemplary embodiment more clearly. If the term "and/or" is used in a list of two or more terms or objects, this can mean that any one of the listed terms or objects may be used alone. It can also mean that any combination of two or more of the listed terms or objects may be used.

Reference will first be made to FIG. 1. FIG. 1 shows a transportation vehicle K, which is equipped with brake elements 1 according to the disclosed embodiments. The brake elements 1 are disk brakes and are mounted on a wheel carrier (not shown in greater detail) for rotation about an axis of rotation R. Brake calipers 2 each contain movable brake pads (not shown), for which the brake element 1 forms a friction surface by its brake disk friction rings. When the brake pads are pressed against the friction surface of the brake elements 1, the transportation vehicle K is slowed down or stopped.

Figure 2:
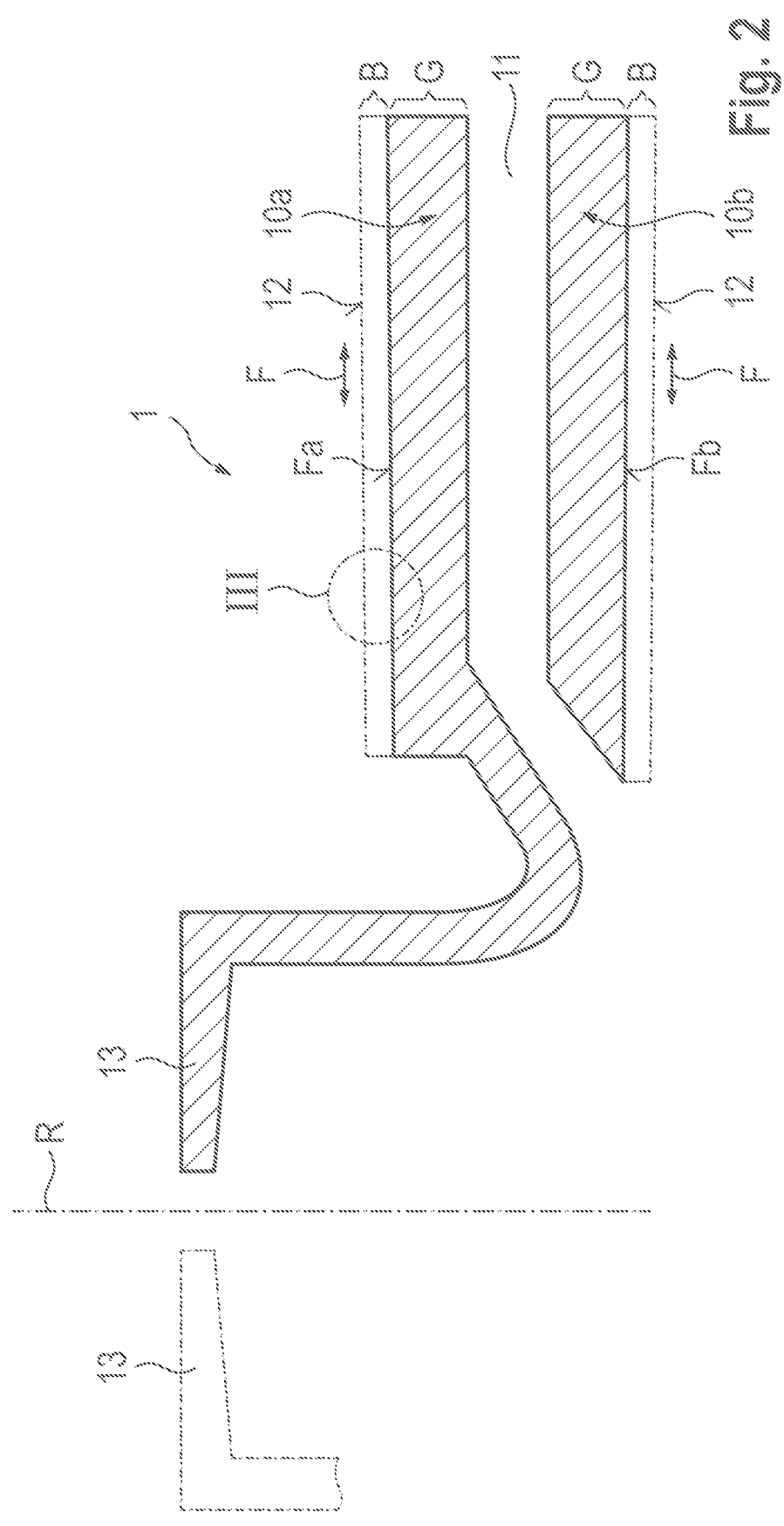
FIG. 2 shows a cross section through a brake element, in an exemplary embodiment.

FIG. 2 shows a brake element 1 in an individual representation and in cross section. The brake element 1 rotates about the notional axis of rotation R. For reasons of rotational symmetry, only half of the brake element 1 is shown.

It can be seen that the brake element 1 in the exemplary embodiment is an internally vented brake disk which has two friction rings 10a and 10b. In a departure from the exemplary embodiment, a brake disk with only one friction ring is also conceivable. Between the friction rings 10a, 10b there is a ventilation gap 11. Necessary spacer ribs between the friction rings 10a, 10b are not shown. Each friction ring 10a, 10b has a planar base body G with a planar side Fa or Fb. Each planar side Fa, Fb has an areal extent F and is provided with a coating B. A friction surface 12 that is active during braking is in each case formed by the coating B.

In the exemplary embodiment, the coating B extends in each case over the entire planar side Fa or Fb of the base body G. In a departure therefrom, it is also conceivable that the coating B is applied only to the region of the planar sides Fa, Fb that is covered by the brake pads.

13 denotes a hub of the brake element 1, which serves for mounting the brake element 1 on a wheel carrier (not shown).

Figure 3:
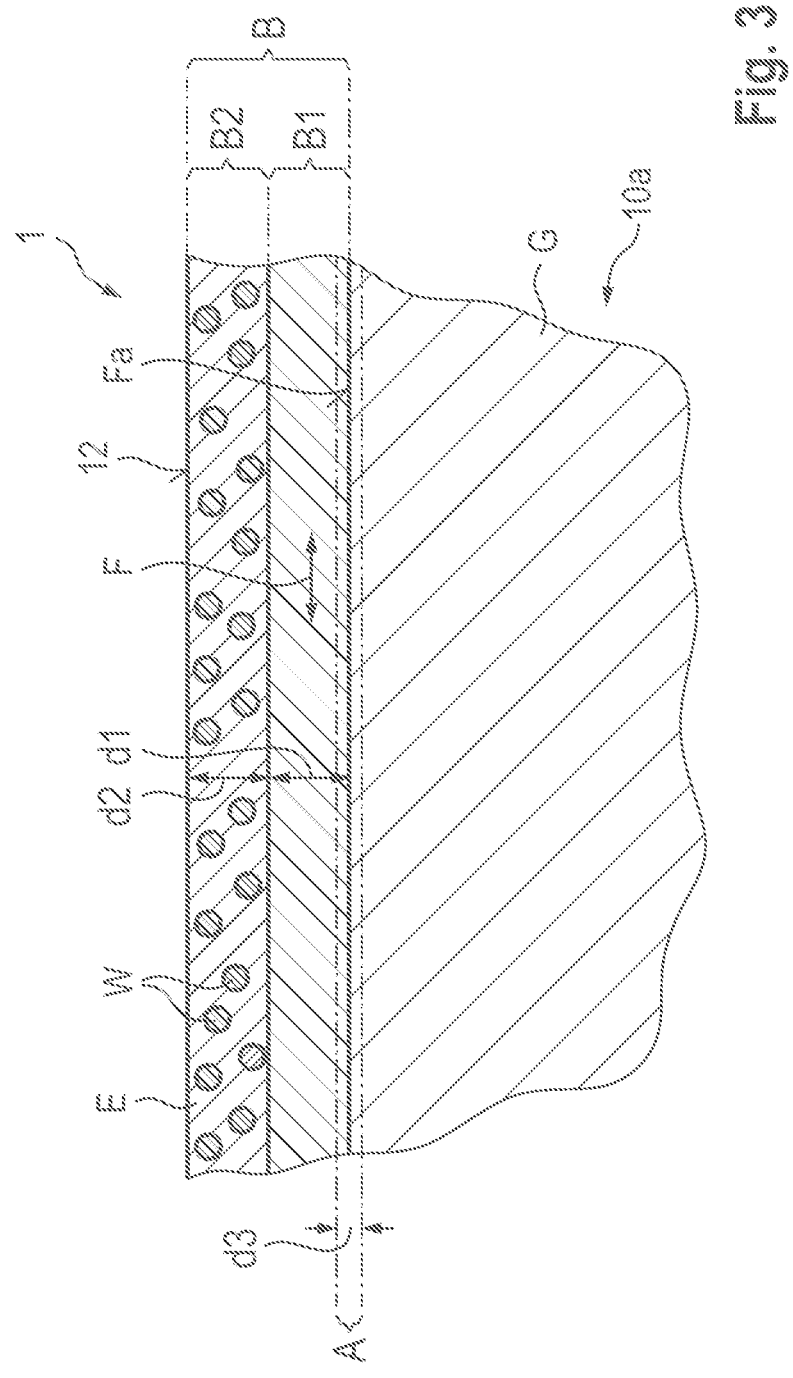
FIG. 3 is a detail view of detail III from FIG. 2.

FIG. 3 shows a detail region from the cross section of the brake element 1. It can be seen that the coating B consists of a first build-up layer B1 and a second build-up layer B2.

The first build-up layer B1 is applied directly to the base body G, that is to say is directly adjacent thereto. The second build-up layer B2 is in turn applied to the first build-up layer B1.

It is clearly shown here that the first build-up layer B1 has a thickness d1 perpendicular to the areal extent F of the planar side Fa (or Fb). This thickness may be in a range of from approximately 40 micrometers to approximately 120 micrometers. Optionally, the first build-up layer B1 has a thickness d1 which is in a range of from approximately 60 micrometers to approximately 100 micrometers.

By contrast, the second build-up layer B2 has a thickness d2, which may be in a range of from approximately 60 micrometers to approximately 420 micrometers. Optionally, the thickness d2 is in a range of from approximately 80 micrometers to approximately 400 micrometers.

By using these layer thickness ranges, the purpose of corrosion protection and inhibition of cracks from the second build-up layer B2 can optimally be fulfilled by the first build-up layer B1.

The indicated thickness range of the second build-up layer B2 fulfils the requirement of high wear resistance, whereby particle emissions resulting from frictional wear can be significantly reduced.

There is further indicated a bonding zone A, which is located at a transition between the base body G and the adjacent first build-up layer B1. The bonding zone A is characterized in that a certain dilution between the material of the base body G and the material of the coating B1 takes place here. The bonding zone A has a thickness d3 perpendicular to the areal extent F which is only very thin and is less than 10 micrometers. Optionally, the bonding zone A has a thickness d3 which is only less than 5 micrometers.

It has been shown that, by such a small thickness of the bonding zone A, on the one hand granulation and an increase in hardness of the first build-up layer A1 can be prevented and on the other hand good adhesion of the first build-up layer B1 to the base body G can nevertheless be achieved. Adhesive tensile strengths far in excess of 50 MPa can be achieved. The basic requirements for high wear resistance and for high corrosion protection can thereby be provided.

In the following text, the materials used will be discussed in greater detail. The base body G is produced from gray cast iron. It is produced together with the hub 3 (see FIG. 2) by a conventional casting method. The first build-up layer B1 consists of an austenitic chromium-nickel-molybdenum steel, which thus represents a particularly ductile and viscous iron alloy.

Optionally, the material of the first build-up layer B1 has material properties which correspond to those of material 1.4404 according to standard EN10027-2 or material 316L of the AISI standard.

The second build-up layer B2 consists of a composite of an iron alloy matrix E with intercalated tungsten carbide particles W. It has been found to be particularly beneficial if the proportion of the volume of the intercalated tungsten carbide particles W to the volume of the iron alloy matrix E in the second build-up layer B2 is in a range of from approximately 20 percent to approximately 40 percent. Optionally, the proportion of the volume of the intercalated tungsten carbide particles W is in a range of from approximately 25 percent to approximately 35 percent of the volume of the iron alloy matrix E.

By using such a volume distribution, on the one hand pronounced crack formation in the second build-up layer B2 can be prevented, and on the other hand wear of the second build-up layer B2 can be limited with good coefficients of friction.

Figure 4:
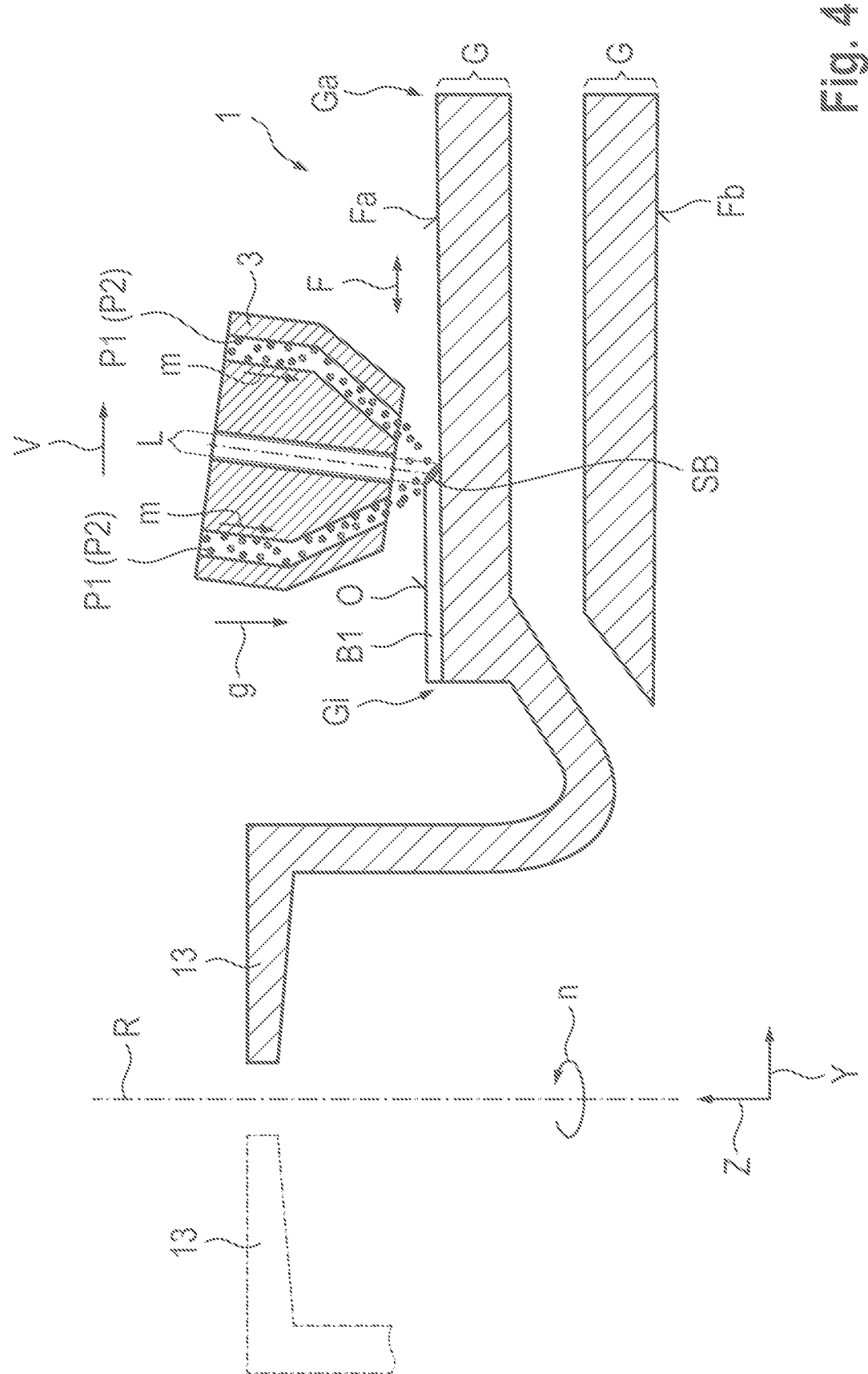
FIG. 4 shows a process operation in the method of producing the brake element.

A first process operation in the production of the coating B (see FIG. 3) of the brake element 1 will now be explained with reference to FIG. 4. First of all, with the aid of a device which is not shown in greater detail, the base body G of the brake element 1 is oriented with its axis of rotation R vertical, that is to say oriented in a vertical direction Z, such that the planar side Fa is oriented with its areal extent F parallel to a horizontal direction Y.

The base body G, that is to say the uncoated brake disk, has previously been produced by the conventional series production process (not explained in greater detail).

Approximately parallel to the axis of rotation R there is a coating tool 3. The coating tool 3 is movable uniaxially orthogonally or radially relative to the axis of rotation R and parallel to the horizontal direction Y. It has at least one laser lens system for producing a laser beam L and a nozzle for ejecting a first powdered coating material P1 (or a second powdered coating material P2). At least one laser source (not shown) and at least one powder feeder (not shown) are connected to the coating tool 3.

The base body G is then set in rapid rotation so that it rotates at a specific speed n about the axis of rotation R. Coating of the base body G begins at a radial inner position Gi and is continued by a radial feed movement V in the direction towards a radial outer position Ga of the base body G.

At the same time as the laser beam L is produced, the mentioned powder feeder is activated such that the first powdered coating material P1 is supplied with a powder mass flow m which is in a range of from approximately 15 g/min to approximately 220 g/min, optionally in the range of from approximately 20 g/min to approximately 200 g/min. The first powdered coating material P1 consists of powder grains of spherical, that is to say ball-shaped, form and consists of a material which corresponds to the first build-up layer B1 that is to be produced.

The speed n of the base body G is adjusted according to the instantaneous position of the coating tool 3 to achieve a thickness of the build-up layer B1 that is constant over the entire surface of the planar side Fa to be coated.

During the coating method, a radiation intensity S of the laser beam L (see also FIG. 5) is set such that it is in a range of from approximately 500 W/mm2 to approximately 1500 W/mm2, optionally in a range of from approximately 600 W/mm2 to approximately 1400 W/mm2. It is thereby ensured that overheating of the build-up layer B1 or B2 to be applied does not occur.

In the illustrated coating method, the coating material, that is to say the powdered coating material P1 or P2, is melted. For this purpose, the powdered coating material P1 or P2 is purposively supplied by the coating tool 3 to the laser beam L that is incident on the base body G, that is to say to the laser spot. The coating material P1 or P2 is there melted and forms a molten pool SB.

By contrast, the base body G does not itself form a molten pool but is only heated locally to a temperature just below its melting temperature. Therefore, unmelted particles of the powdered coating material P1 or P2 are not introduced into a melt of the base body G, but a molten pool SB of the particles of the powdered coating material P1 or P2 is deposited. At the immediate boundary between the molten coating material (P1 in the image) and the locally strongly heated surface of the substrate G (here the base body G), very good bonding of the coating material (here P1) to the substrate (here base body G) takes place by a diffusion process without increased dilution of the materials involved.

Because the powdered coating material P1 or P2 is introduced into the laser beam L in the direction or approximately in the direction of gravity g, it can remain in the laser beam L for as long as possible and good melting can take place.

Figure 5:
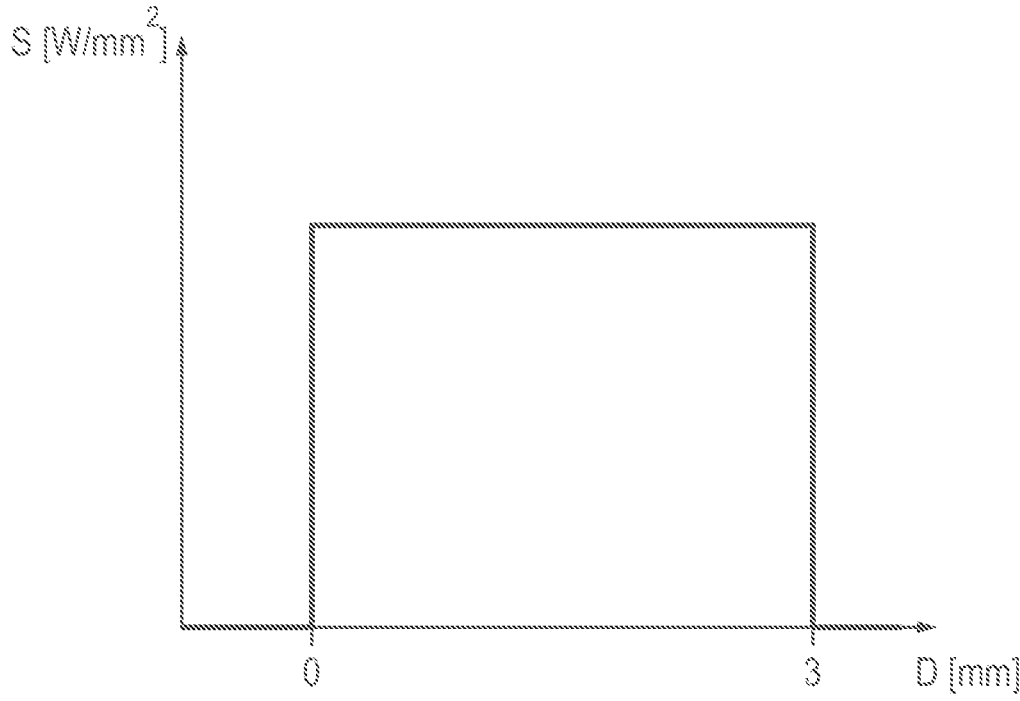
FIG. 5 shows an intensity distribution of the energy beam on the respective substrate.

FIG. 5 shows a radiation intensity S of the laser beam L over a diameter D of a laser spot which forms on the surface to be coated.

In the exemplary embodiment, a laser spot with a diameter D of approximately 3 mm may be formed. It can be seen that the laser intensity S remains approximately constant over the entire diameter D of the laser spot. The radiation intensity S of the laser beam L thus forms a so-called top hat profile (or also rectangular profile).

It should be mentioned that, during coating, the coating tool 3 is moved radially outwards with a feed movement V which has a speed of over approximately 90 m/min, optionally over approximately 100 m/min.

Furthermore, a feed movement V of the coating tool and a speed of rotation of the brake element 1 are matched to one another such that, during a complete rotation of the brake element 1 through 360 degrees, an overlap of a coating track applied during the rotation and a previously applied coating track which is in a range of from approximately 85 percent to approximately 95 percent, optionally in a range of approximately 90 percent, is obtained. Overall, a helical profile of the applied layer tracks is thereby obtained for each build-up layer (B1 or B2).

The radial feed movement V may be set at approximately 0.3 mm per rotation.

When the first build-up layer B1 has been applied in the desired manner to the base body G, the second layer B2 is applied in a corresponding manner to a surface O of the first build-up layer B1.

The coating tool 3 is thereby again fed radially from the inside to the outside. However, to apply the second build-up layer B2, the second powdered coating material P2 is now supplied to the laser beam L. The second powdered coating material may also be powder grains of spherical form. As already mentioned, the material consists of a material with a similar composition to iron alloy 1.4404 and additional tungsten carbide particles.

In a departure from tungsten carbide particles, it is also conceivable to use ceramic, metallic materials or composite materials of oxide-ceramic, carbide or boride particles in the iron alloy matrix E. For example, chromium carbides, titanium carbides or also niobium carbides are conceivable. Instead of the iron alloy matrix E, especially nickel-based alloys or alternative iron-based alloys can alternatively be used.

| List of reference signs | |
|---|---|
| 1 | brake element |
| 2 | brake caliper |
| 3 | coating tool |
| 10a, b | friction ring |
| 11 | ventilation gap |
| 12 | friction surface |
| 13 | hub |
| A | bonding zone |
| B | coating |
| B1 | first build-up layer |
| B2 | second build-up layer |
| D | diameter |
| d1 | thickness |
| d2 | thickness |
| d3 | thickness |
| E | iron alloy matrix |
| F | areal extent |

-continued

| List of reference signs | |
|---|---|
| Fa, Fb | planar side |
| G | base body |
| Gi | radial inner position |
| Ga | radial outer position |
| g | gravity |
| K | transportation vehicle |
| L | laser beam |
| m | powder mass flow |
| n | speed |
| O | surface |
| P1 | first powdered coating material |
| P2 | second powdered coating material |
| R | axis of rotation |
| S | radiation intensity |
| SB | molten pool |
| V | feed movement |
| W | tungsten carbide particles |
| Y | horizontal direction |
| Z | vertical direction |

The invention claimed is:

1. A brake element for a transportation vehicle, the brake element comprising:

a base body that is planar, at least in some regions, to the planar sides of which at least two build-up layers are applied in each case at least in some regions, wherein the at least two build-up layers include a first build-up layer and a second build-up layer and together form a surface which, in the mounted state of the brake element on the transportation vehicle, serves as a friction surface for a brake pad, wherein there is a bonding zone in which both a material of the base body and a material of a build-up layer adjacent to the base body are present, and wherein the bonding zone has a thickness perpendicular to an areal extent of a planar side that is less than 10 μm, wherein the first build-up layer is adjacent to the base body, and the second build-up layer is applied to the first build-up layer, wherein, when viewed perpendicular to the areal extent of a planar side, the first build-up layer has a thickness in a range of from 40 μm to 120 μm and the second build-up layer has a thickness in a range of from 60 μm to 420 μm, wherein the second build-up layer consists of a composite of an iron alloy matrix with intercalated chromium carbide, titanium carbide or niobium carbide particles, and wherein the proportion of a volume of the intercalated chromium carbide, titanium carbide or niobium carbide particles to the volume of the iron alloy matrix is in a range of from 20% to 40%.

2. The brake element of claim 1, wherein the first build-up layer consists of an austenitic chromium-nickel-molybdenum steel.

3. The brake element of claim 2, wherein the material of the first build-up layer has material properties which correspond to those of material 1.4404 according to standard EN10027-2 or material 316L according to the AISI standard.

4. The brake element of claim 1, wherein the iron alloy matrix consists of a material which has material properties which correspond to those of material 1.4404 according to standard EN10027-2 or material 316L according to the AISI standard.

* * * * *